United States Patent
Jander

(10) Patent No.: US 7,026,043 B2
(45) Date of Patent: Apr. 11, 2006

(54) SHEET MOLDING COMPOUND HAVING IMPROVED SURFACE CHARACTERISTICS

(75) Inventor: Michael H. Jander, Eupen (BE)

(73) Assignee: Owens Corning Composites SPRL, Brussels (BE)

(*) Notice: Subject to any disclaimer, the term of this patent is extended or adjusted under 35 U.S.C. 154(b) by 193 days.

(21) Appl. No.: 09/993,435

(22) Filed: Nov. 20, 2001

(65) Prior Publication Data

US 2003/0082361 A1 May 1, 2003

Related U.S. Application Data

(60) Provisional application No. 60/328,860, filed on Oct. 12, 2001.

(51) Int. Cl.
*B32B 17/04* (2006.01)
*B32B 17/10* (2006.01)
*B32B 17/12* (2006.01)

(52) U.S. Cl. .................. 428/297.4; 428/299.4; 428/300.7; 428/301.4; 442/394; 156/179

(58) Field of Classification Search ........... 156/179, 156/178, 250, 247, 289, 578
See application file for complete search history.

(56) References Cited

U.S. PATENT DOCUMENTS

| | | | |
|---|---|---|---|
| 2,750,315 A | 6/1956 | Tierney | |
| 3,562,088 A | 2/1971 | Newman | |
| 3,567,671 A | 3/1971 | Janetos | |
| 3,620,906 A | 11/1971 | Hannes | |
| 3,660,196 A | 5/1972 | Keeling | |
| 3,716,437 A | 2/1973 | Newman | |
| 3,734,814 A | 5/1973 | Davis, Sr. et al. | |
| 3,788,271 A | 1/1974 | Carpenter | |
| 3,874,973 A | 4/1975 | Jeanson | |
| 3,969,178 A | 7/1976 | Jeanson | |
| 4,044,188 A | 8/1977 | Segal | |
| 4,098,630 A | 7/1978 | Morse | |
| 4,105,623 A | 8/1978 | Shannon et al. | |
| 4,141,929 A * | 2/1979 | Stoops et al. ............. 525/12 |
| 4,207,282 A | 6/1980 | Grisch | |
| 4,239,794 A | 12/1980 | Allard | |
| 4,278,491 A | 7/1981 | Morse | |
| 4,278,720 A | 7/1981 | Shannon | |
| 4,282,049 A | 8/1981 | Morse | |
| 4,302,499 A | 11/1981 | Grisch | |
| 4,303,716 A | 12/1981 | Eshbach | |
| 4,308,313 A | 12/1981 | Groff | |
| 4,362,675 A | 12/1982 | Shannon | |

(Continued)

FOREIGN PATENT DOCUMENTS

DE 19949318 3/2001

(Continued)

*Primary Examiner*—Sam Chuan Yao
(74) *Attorney, Agent, or Firm*—Inger H. Eckert; James J. Dottavio

(57) ABSTRACT

A composite part made from a sheet molding compound is disclosed as having improved characteristics over traditional sheet molding compound composite parts. The composite part may be made from a unique sheet molding compound material having a resin impregnated filamentized fiber layer and a resin impregnated fiber layer prior to compaction. The resin impregnated filamentized fiber layer side prevents the movement of partially filamentized or unfilamentized fibers to the visible surface of the composite part when the part is molded. The resin impregnated filamentized fiber layer may be contain a conductive filamentized fiber such that the surface of a sheet molding compound may be conductive and be capable of being electrostatically sprayed.

12 Claims, 8 Drawing Sheets

U.S. PATENT DOCUMENTS

| | | |
|---|---|---|
| 4,430,284 A | 2/1984 | Rasmussen |
| 4,434,023 A | 2/1984 | Kanamori et al. |
| 4,474,845 A | 10/1984 | Hagerman et al. |
| 4,500,595 A | 2/1985 | Gerteisen et al. |
| 4,554,204 A | 11/1985 | Ono et al. |
| 4,601,741 A * | 7/1986 | Stotler et al. .................. 65/458 |
| 4,689,098 A | 8/1987 | Gaughan |
| 4,784,899 A | 11/1988 | Ono et al. |
| 4,989,538 A | 2/1991 | Tamura et al. |
| 5,078,934 A | 1/1992 | Yamamoto et al. |
| 5,225,135 A | 7/1993 | Kia |
| 5,266,138 A | 11/1993 | Razavi |
| 5,395,470 A | 3/1995 | Toh et al. |
| 5,403,631 A | 4/1995 | Sato et al. |
| 5,487,928 A | 1/1996 | Fujimoto |
| 5,490,893 A | 2/1996 | Enlow et al. |
| 5,518,577 A | 5/1996 | Jinbo et al. |
| 5,635,252 A | 6/1997 | Fraser, Jr. et al. |
| 5,653,923 A | 8/1997 | Spoo et al. |
| 5,811,046 A | 9/1998 | Dous et al. |
| 5,858,404 A | 1/1999 | Dous et al. |
| 5,888,340 A | 3/1999 | Vyakarnam et al. |
| 5,959,031 A | 9/1999 | Thurgood |
| 6,001,919 A | 12/1999 | Yen et al. |
| 6,103,032 A | 8/2000 | Greve |
| 6,119,750 A | 9/2000 | Greve |

FOREIGN PATENT DOCUMENTS

| | | |
|---|---|---|
| EP | 0273145 | 7/1988 |
| EP | 080187 | 11/1997 |
| EP | 1099541 | 5/2001 |

* cited by examiner

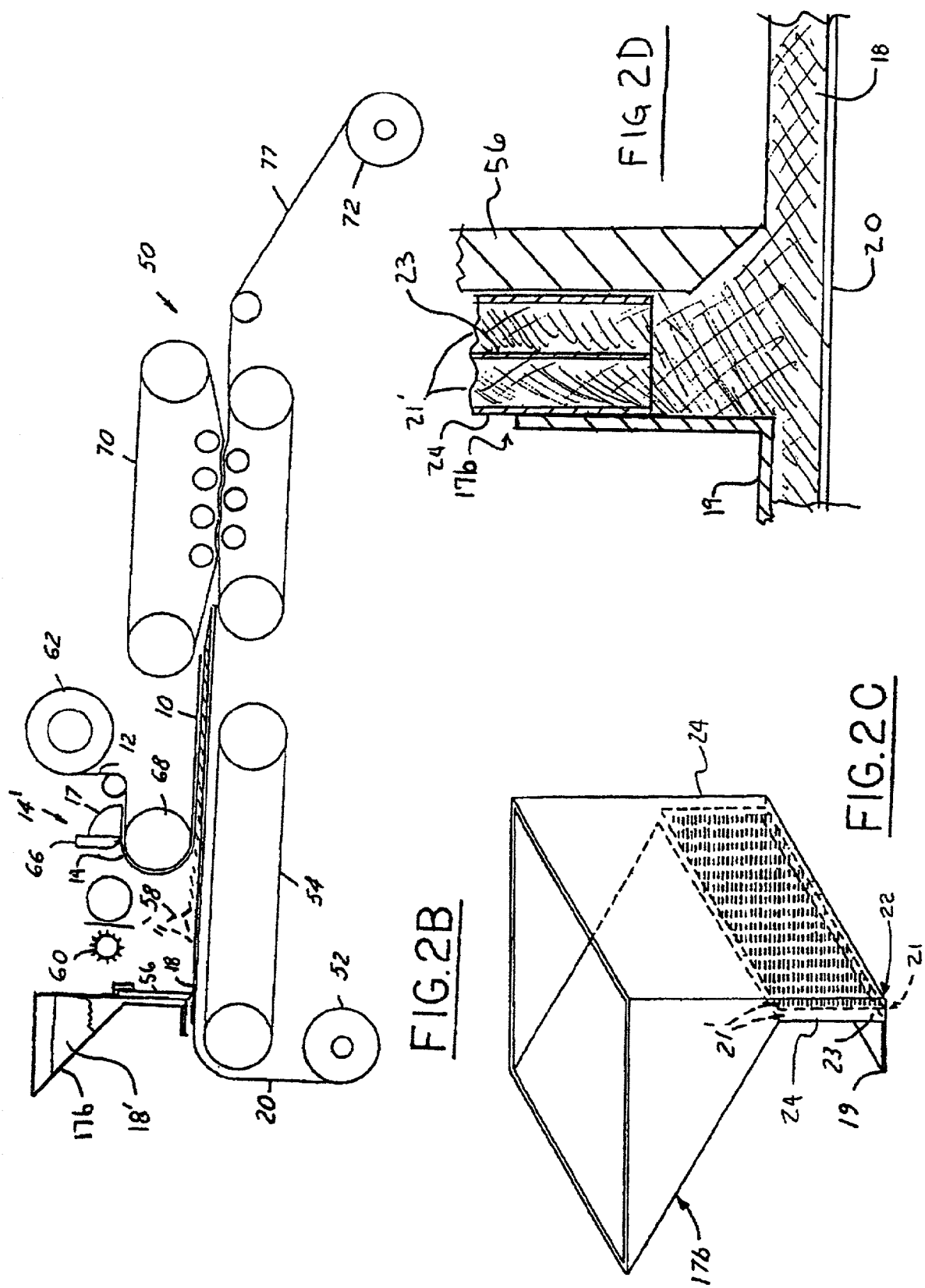

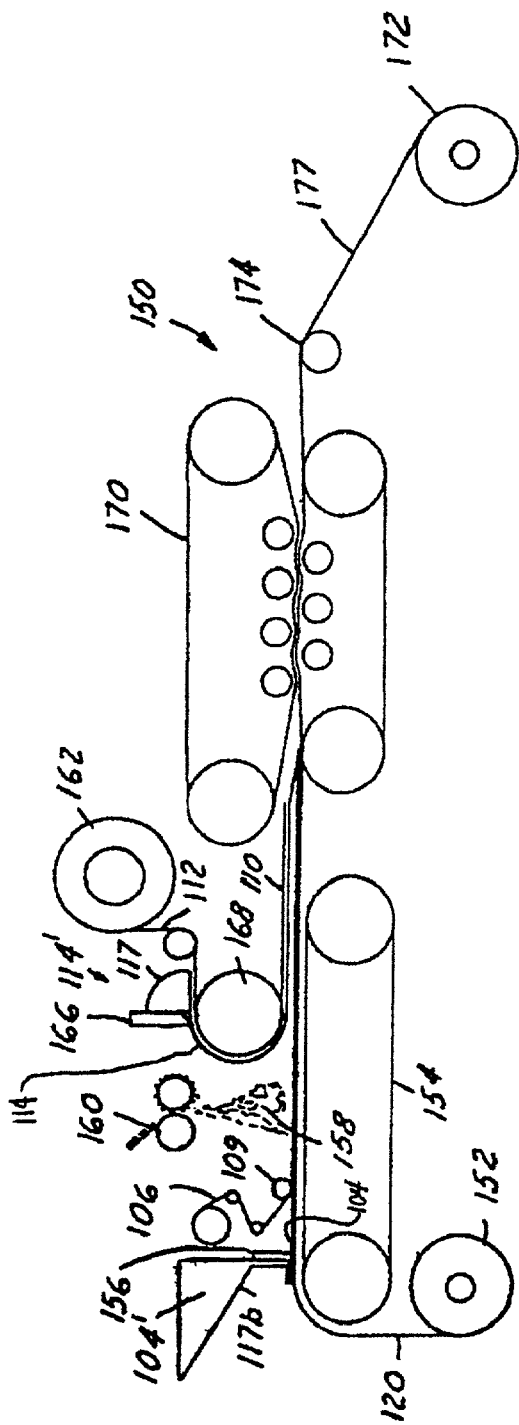
FIG. 4C
FIG. 3A
FIG. 3B

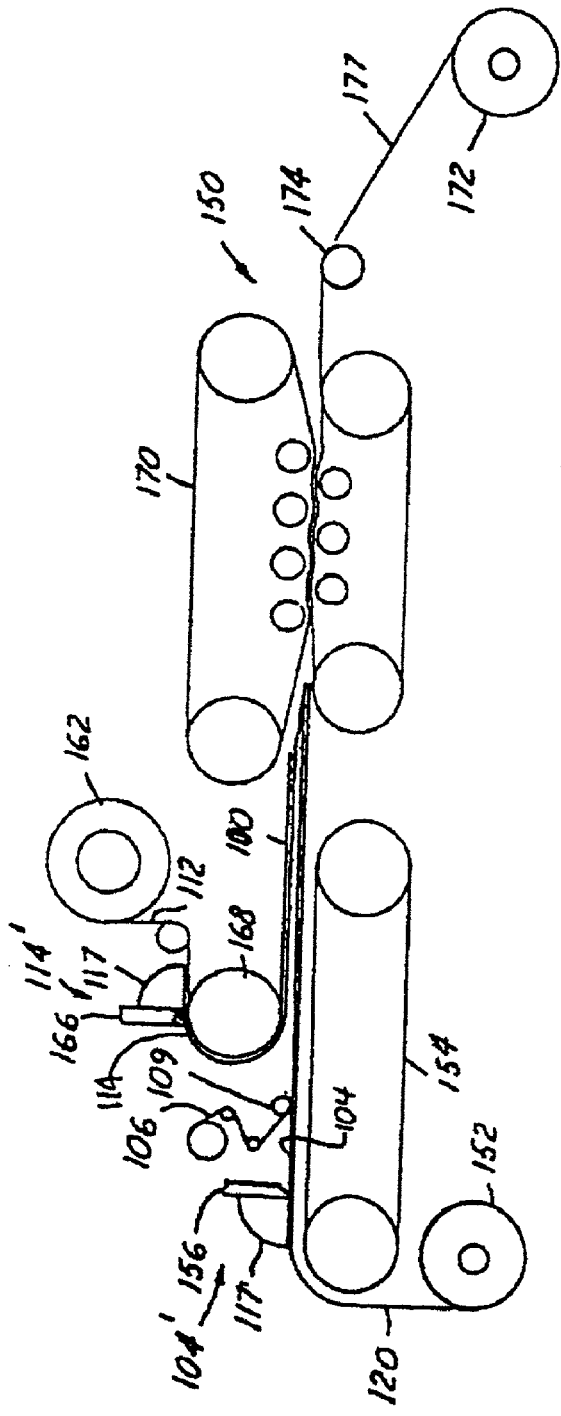
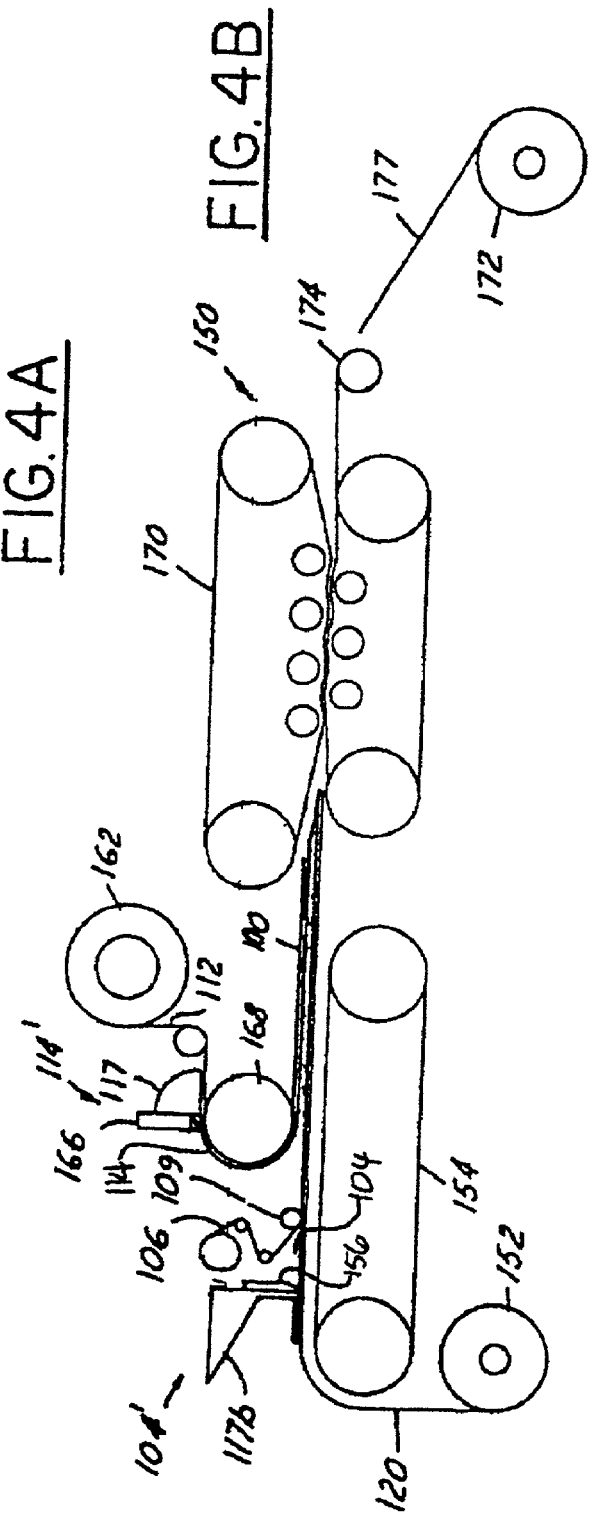

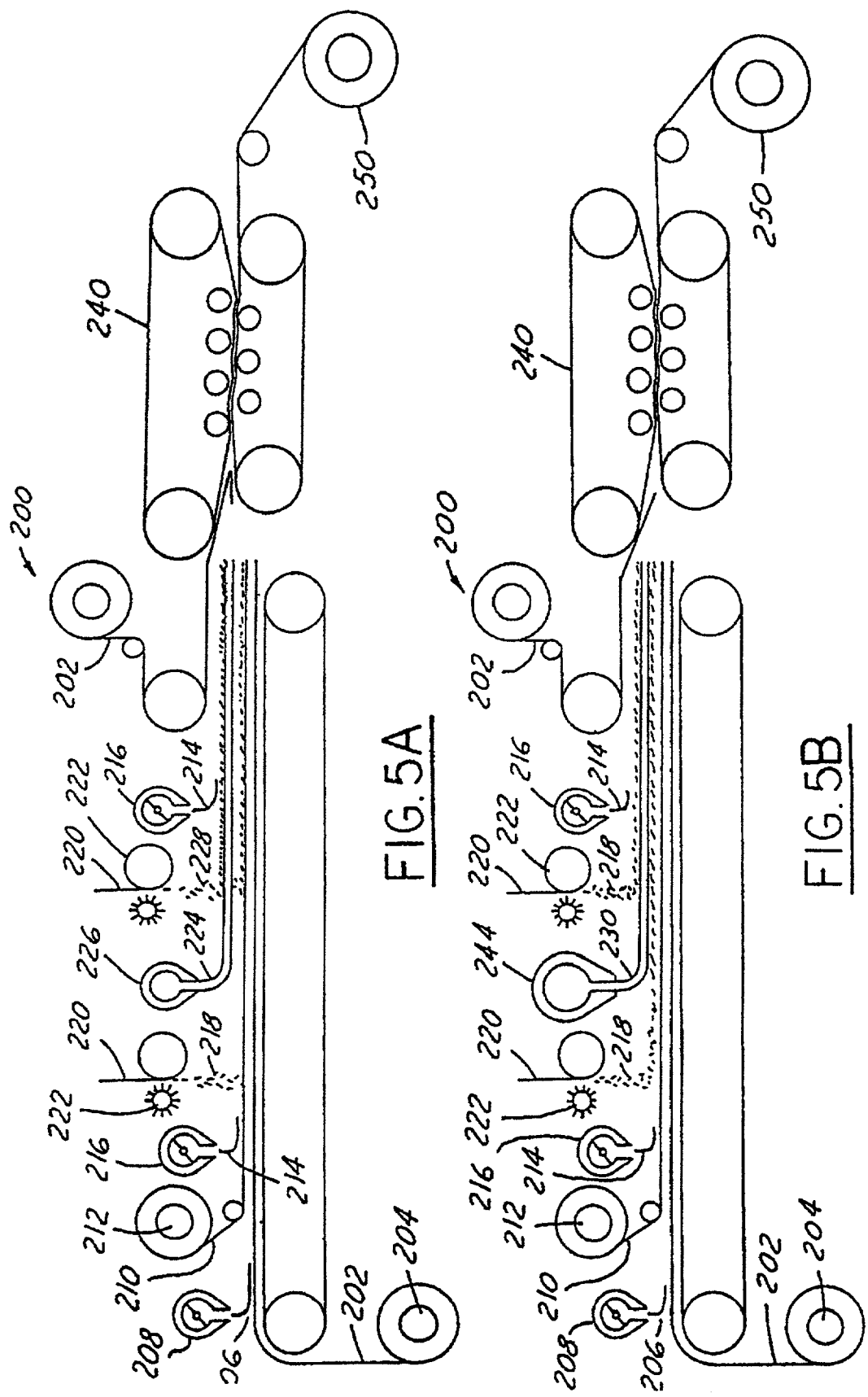

SHEET MOLDING COMPOUND HAVING IMPROVED SURFACE CHARACTERISTICS

CROSS-REFERENCE TO RELATED APPLICATIONS

The present invention claims priority from Provisional Application Serial No. 60/328,860 entitled "Sheet Molding Compound Having Improved Characteristics, filed Oct. 12, 2001, which is incorporated herein by reference.

TECHNICAL FIELD AND INDUSTRIAL APPLICABILITY OF THE INVENTION

The present invention relates generally to reinforced fiber composites and more specifically to sheet molding compounds having improved conductive and/or surface characteristics.

BACKGROUND OF THE INVENTION

In the manufacture of fiber reinforced resin products, sheet molding compounds are frequently used. Sheet molding compounds offer an appealing solution for the production of Class A surface parts compared to steel both in terms of cost and coefficients of thermal expansion.

Sheet molding compounds consist of a mixture of a liquid thermosetting resin, particulate filler and chopped reinforcement fibers, such as glass fibers. In most cases, the resin and chopped fibers are sandwiched between films of plastic material to form a laminated sheet that is wound in rolled form or festooned for storage. The laminated sheet is stored under conditions that will not result in final curing of the resin, but will allow the paste to thicken to a desired molding viscosity range, typically between 30,000 and 50,000 centipoise (MilliPascal seconds). At the time of use, the protective carrier film is removed and the laminated sheet is cut into blanks, or plies, of a desired shape and size. The plies are then molded to form a cured composite part. In most applications, multiple plies of the laminated sheets are used in the composite structure and typically comprise between 25 and 50% of the die/tool's surface area. When the laminated sheets are molded, the resin and glass flow within the mold under heat and pressure to cover the entire surface of the mold. Sheet molding compounds are used in a variety of applications that require aesthetic appeal, corrosion resistance, lighter weight dimensional control and high strength.

One deficiency with currently available sheet molding compounds is that the charge typically does not form a Class A type surface parts when cured. This is due to the fact that the chopped fibers move to the surface of the sheet molding compound to form surface imperfections. Further, the fiber used in some sheet molding compounds typically does not flow well in the mold, and this creates surface imperfections such as surface pores. Thus, sheet molding compounds require sanding and polishing, or otherwise reworking to be used in applications requiring a desired surface appearance.

Yet another problem with surface characteristics occurs when these composite parts formed from the sheet molding plies are painted. Paint pops may be caused by the release of volatile liquids (such as water, styrene or di-vinyl benzene monomer) from the sheet molding paste or by the release of moisture or solvents contained within fiber bundles during the curing process are quite common, typically affecting 5–10% or more of painted SMC composite parts. This leads to substantial cost in terms of rework and waste.

In addition, to allow a long and uniform flow that will produce a wavefree surface, the fibers used in sheet molding compounds are typically provided by the glass manufacturer as bundles or "splits" of multiple filaments. The act of impregnating the bed of chopped fibers between two layers of sheet molding compound paste often leaves air trapped within the composite sheet, most often besides the bundles where small differences in surface tension adversely affects the wetting of the bundles or splits. Unfortunately, this bundling may also include entrapped air which, when released during the flow, produces tiny bubbles which travel slowly under a pressure gradient. To evacuate these bubbles, it is useful to have the molding compound flow to fill out the tool to allow the action of the pressure gradients to move those air bubbles towards the edge of the flow front and thus towards the edge of the part. Such large flow typically calls for loading the tool by a charge representing 50% or less of the area of the part It is therefore highly desirable to improve the surface characteristics of sheet molding compound. This would allow sheet molding compound parts to be used in a wider variety of composite applications wherein surface quality is a concern.

SUMMARY OF THE INVENTION

It is thus an object of the present invention to improve the physical and surface characteristics and electrostatic sprayability of composites parts made of sheet molding compound composite sheets.

The present invention addresses the above object and comprises a composite part may be made from a unique sheet molding compound composite sheet having a thin resin surface layer, a resin impregnated filamentized fiber layer, a resin impregnated unfilamentized or partially filamentized fiber layer, and a second resin paste layer. The resin impregnated filamentized fiber layer side acts as a barrier to prevent the movement of partially filamentized or unfilamentized fibers into the thin resin surface layer of the composite part when the part is compacted, molded and cured. This presents a visible surface that is resin rich and porous free, which is shown to improve surface characteristics of the composite part without adversely affecting strength and stiffness characteristics.

Other objects and advantages of the present invention will become apparent upon considering the following detailed description and appended claims, and upon reference to the accompanying drawings.

BRIEF DESCRIPTION OF THE DRAWINGS

FIG. 2B is an alternate schematic diagram for making the sheet molding compound of FIGS. 1A and 1B;

FIG. 2C is a close-up view of the funnel shaped dispensing device of FIG. 2B;

FIG. 2D is an enlarged partial cross sectional view of the funnel shaped dispensing device shown in FIG. 2B.

FIGS. 3A and 3B are a perspective view of a sheet molding compound having improved surface characteristics according to another preferred embodiment of the present invention;

FIG. 4A is a schematic diagram for making the sheet molding compound of FIG. 3A;

FIG. 4B is a schematic diagram for making the sheet molding compound of FIG. 3A;

FIG. 4C is a schematic diagram for making the sheet molding compound of FIG. 3B;

FIG. 5A is a schematic diagram for making a sheet molding compound according to another preferred embodiment of the present invention;

FIG. 5B is a schematic diagram for making a sheet molding compound according to another preferred embodiment of the present invention;

DETAILED DESCRIPTION AND PREFERRED EMBODIMENTS OF THE INVENTION

Figure 1B:
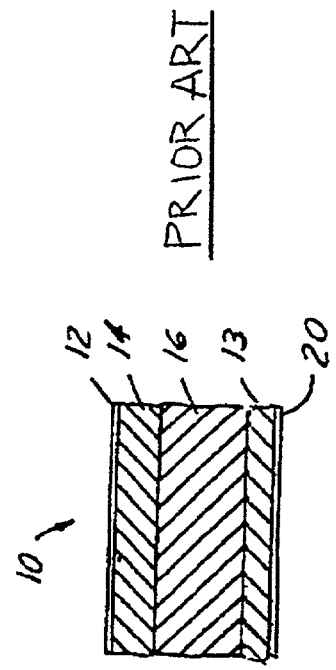
FIG. 1B is a cross-sectional view of a prior art sheet molding compound.
Figure 1A:
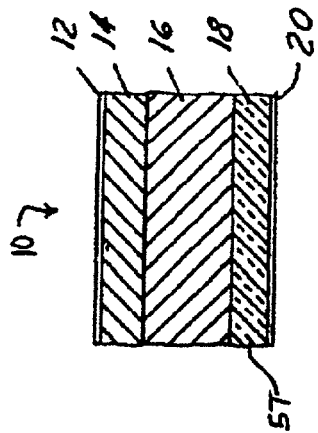
FIG. 1A is a cross-sectional view of a sheet molding compound having improved surface characteristics according to one preferred embodiment of the present invention.
Figure 6A:
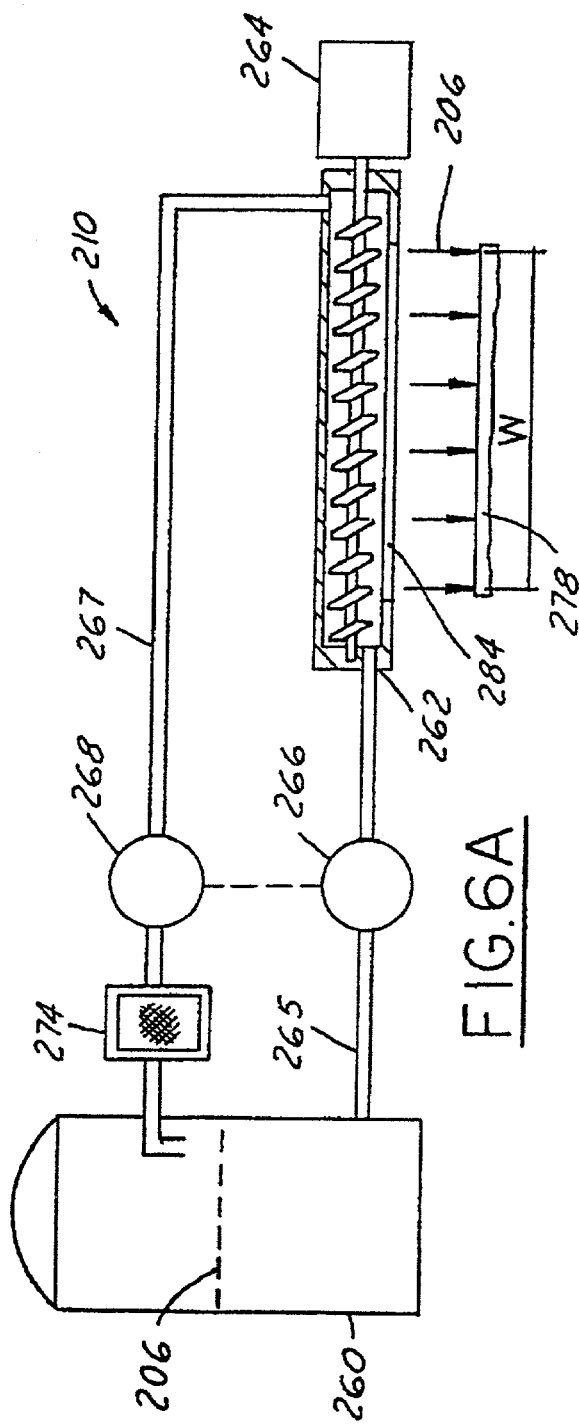
FIG. 6A and 6B are a close-up view of the volumetric paste extrusion device used in FIGS. 5A and 5B.
Figure 7A:
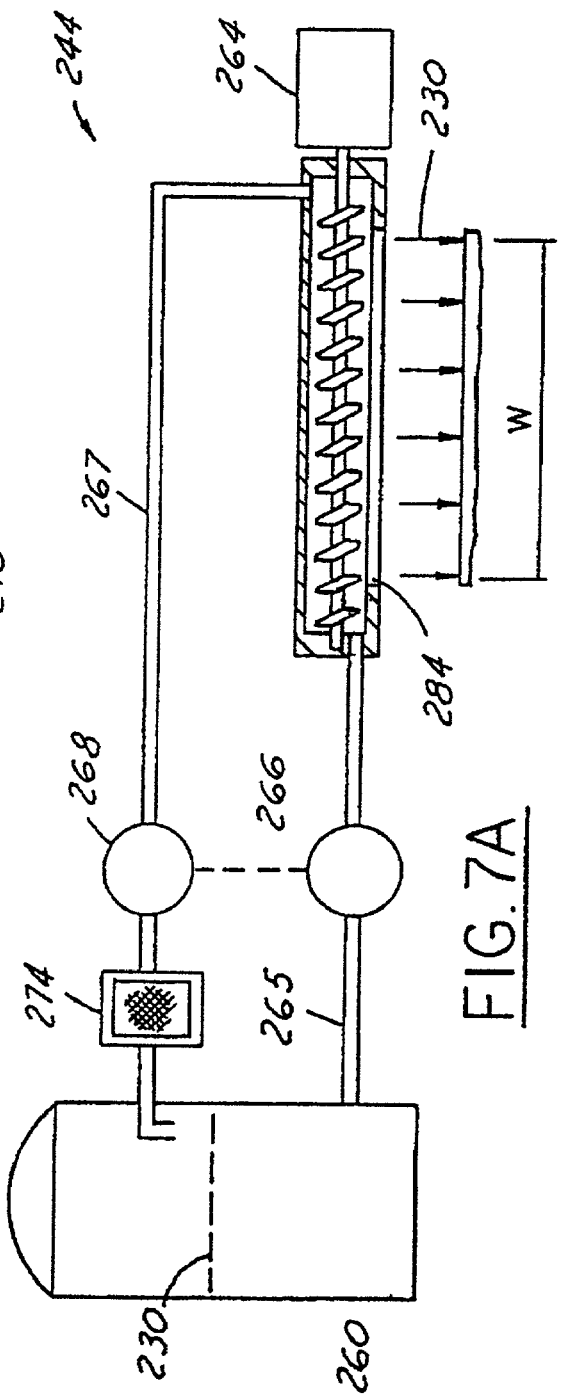
FIGS. 7A and 7B are a close-up view of the bulk molding volumetric extrusion device of FIGS. 5A and 5B.
Figure 6B:
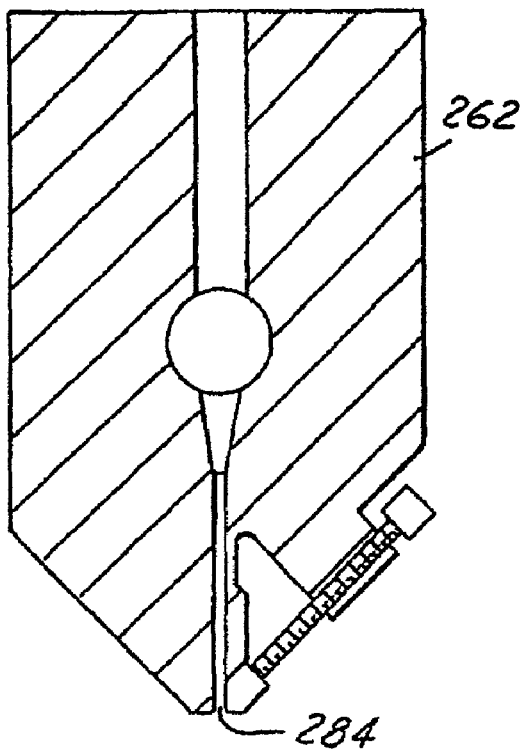
Figure 7B:
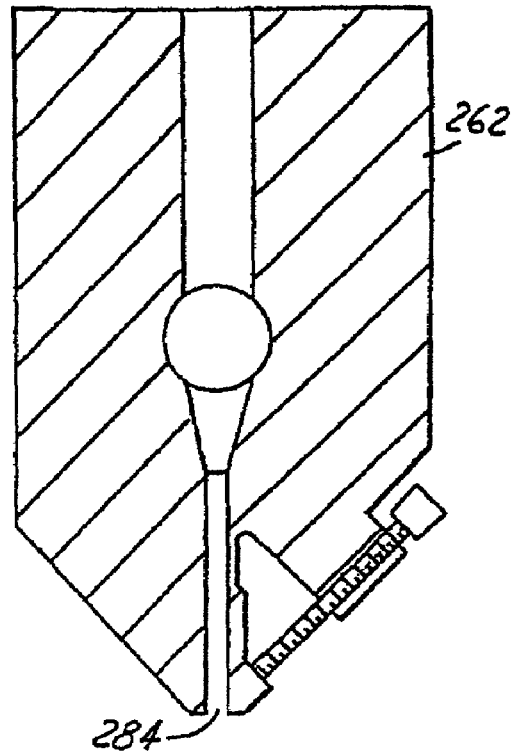
Figure 8:
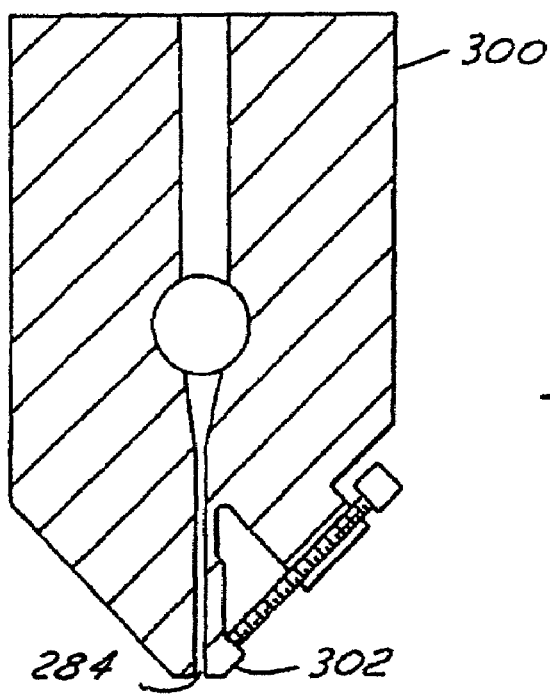
FIG. 8 depicts another preferred embodiment of a slit extrusion die of FIGS. 5A and 5B having a deformable lip.
Figure 9:
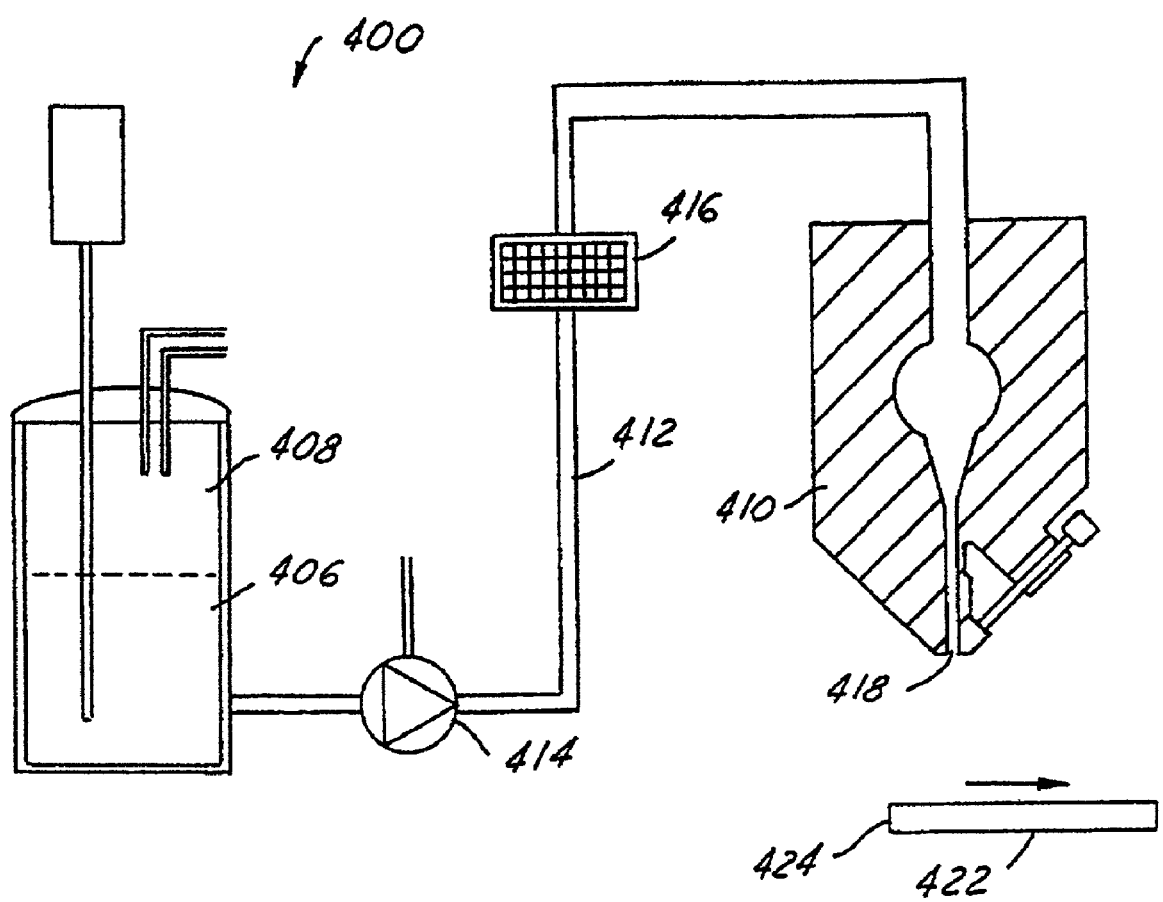
FIG. 9 depicts another preferred embodiment of a volumetric paste extrusion device that can be used in FIGS. 5A and 5B.

Referring now to FIG. 1A, a sheet molding compound made in accordance with a preferred embodiment of the present invention is generally shown as 10 prior to compaction. The sheet molding composite (SMC) sheet 10, from top to bottom, is shown having an upper carrier film layer 12, a top resin paste layer 14, a resin impregnated unfilamentized or partially filamentized fiber layer 16, a resin impregnated filamentized fiber layer 18 (including paste 18' and filamentized fibers 57) and a bottom carrier film layer 20. Of course, the order of the layering from top to bottom for a finished composite part made from this sheet molding compound is reversed, as the resin impregnated filamentized fiber layer 18 forms the class A surface side desired when the SMC sheet 10 is made into a finished part. The process for forming the SMC sheet 10 of FIG. 1A is shown below in FIGS. 2A and 2B. Additionally, the cross-section of FIG. 1B may be made using this device, provided the paste 18' does not include filamentized fibers 57, and therefore the shown bottom layer 13 of FIG. 1B does not include these fibers as does the layer of paste 18 of FIG. 1A (one skilled in the art appreciates that the layer of paste 18 (and the paste 18') in the remaining figures could be replaced by a nonfilamentized paste, or layer of nonfilamentized paste 13, where appropriate).

The compositions of the resin-containing layers 14, 18 used in the present invention are variations to formulations currently used for molding Class A surface and/or structural parts. In addition to the polyester resin (which may include the thermoplastic, thermoset, reactive monomer, etc. as known to one skilled in the art), the formulation contains fillers such as calcium carbonate, a resin inhibitor and initiator (catalyst), an alkaline earth oxide or urethane thickening agent, and an internal mold release agent. Of course, other additives may be added depending upon the desired characteristics of the paste and finished composite part.

For the unfilamentized or partially filamentized fiber layer 16 formulation, chopped fibers (shown as 58 in FIG. 2A) are also introduced to the formulation. These chopped fibers 58 preferably comprise between approximately 0.25 and 60 percent by weight of the formulation. Any suitable chopped fiber may be used in the invention. Preferably, the chopped fiber 58 is be selected from fibrous materials that are commonly known in the art, such as glass, carbon, natural fibers, polymers and other fiberizable materials known in the art, or mixtures thereof.

For the resin-impregnated filamentized fiber layer 18 formulation, chopped and filamentized or milled fibers are mixed between about 0.25 and 30% by weight in the formulation without fillers. Any suitable fiber that may be filamentized, flaked or milled can be used in the invention.

A preferred composition for the resin paste layer 14 and the resin impregnated filamentized fiber layer 18 are shown below in Table 1 and 2, respectively. As noted herein, the glass fibers shown in table 2 may be supplemented with, or replaced by, other fibers, such as carbon fibers or flakes, preferably in the range of about 0.1 to 10% by weight of the filamentized paste 18 and replacing a portion of the glass fiber content. One preferable composition for a conductive resin impregnated fiber layer 18 is shown in Table 3 below.

TABLE 1

SMC RESIN PASTE LAYER 14

| INGREDIENTS | WEIGHT % | MANUF. NAME | DESCRIPTION |
|---|---|---|---|
| T341 | 16.95 | AOC/Alpha Owens Corning | Thermosetting Polyester Resin in styrene |
| T154 | 7.24 | AOC/Alpha Owens Corning | Thermoplastic Polyester resin in styrene |
| Styrene | 3.13 | Ashland | Styrene monomer |
| DVB | 1.33 | Dow | Divinyl benzene |
| P710 | 0.88 | BASF | Polypropylene oxide |
| PBQ | 0.008 | Aldrich | P-benzoquinone |
| CBA-60 | 0.88 | Witco | Non-ionic surfactant |
| 1300x40 | 0.59 | B. F. Goodrich | Hycar Rubber in styrene |
| TBPB | 0.53 | Atofina | T-butyl perbenzoate catalyst |
| Cal St | 1.18 | Mallinckrodt | Mold Release Agent |
| Huber W-4 | 62.02 | Huber | Calcium carbonate |
| RP510 | 1.83 | AOC/Alpha Owens Corning | Thermoplastic polyester resin in Styrene |
| Zn St | 0.15 | Mallinckrodt | Mold release agent |
| PDI-1805 | 0.03 | Ferro | Iron pigment |
| Huber W-4 | 2.66 | Huber | Calcium carbonate |
| CaO | 0.53 | C. P. Hall | Alkaline earth oxide thickener |
| Water | 0.05 | | |

TABLE 2

FILAMENTIZED LAYER 18 PASTE

| Function | Component | Weight percent |
|---|---|---|
| Table 1 Resin Paste 14 Formulation (may be less some or all fillers) | Sheet Molding Resin | 72–73% |
| Owens Corning R25H | E-type glass reinforcement | 27–28% |

TABLE 3

CONDUCTIVE FILAMENTIZED LAYER 18 PASTE

| Function | Component | Weight percent |
| --- | --- | --- |
| Table 1 Resin Paste 14 Formulation (may be less some or all fillers) | Sheet Molding Resin | 72–73% |
| Toray 300 | Conductive Carbon Fiber | 0.1–10% |
| Owens Corning 954 or 973 | E-type glass reinforcement | 0.1–15% |

Figure 2A:
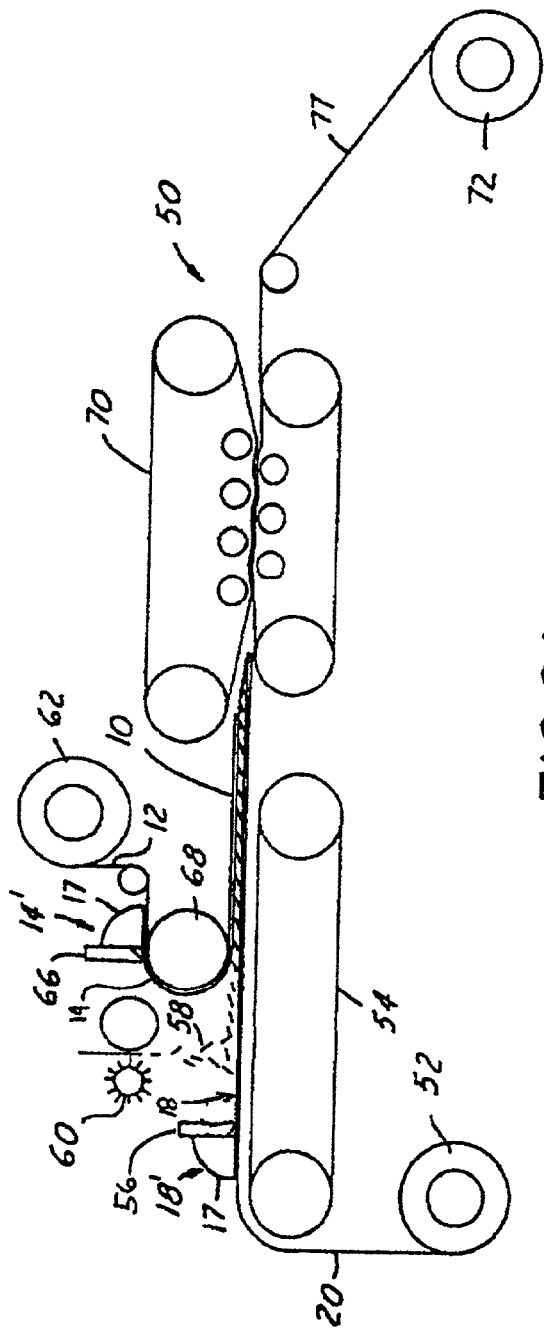
FIG. 2A is a schematic diagram for making the sheet molding compound of FIGS. 1A and 1B.

Referring now to FIG. 2A, one preferable assembly process is shown for making a compacted SMC sheet 77 from the SMC sheet 10 of FIG. 1A is generally shown as 50. The assembly process begins by unrolling the bottom carrier film layer 20 from a roll or reel 52 and transporting it across a carrier belt 54. Of course, in other embodiments, the carrier belt 54 is not necessary where the tensile strength of the carrier film 20 is sufficiently strong to hold the entire SMC sheet 10. The resin impregnated filamentized fiber layer 18 is then introduced onto the film layer 20 in the form of a wet paste 18' from a traditional dispensing device 17. The device 17 preferably meters the paste 18' using a doctor blade 56, generally an upside down weir blade. The device illustrated here is illustrated with an arcuate rear side opposite the doctor blade 56, but one skilled in the art appreciates a rectangular doctor box may be used as well.

Partially filamentized or unfilamentized fiber 58 is then chopped using a chopper 60 onto the resin impregnated filamentized fiber layer 18. An upper carrier film layer 12 is unrolled from a roll or reel 62 and a second resin paste layer 14 is deposited onto the second carrier film 12 using another traditional dispensing device 17. The second resin paste layer 14 is deposited as a wet paste 14' onto the inner side of the upper carrier film 12. The thickness of the second resin paste layer 14 is controlled using a doctor blade 66. The upper carrier film layer 12 and second resin paste layer 14 is then rolled around a roller 68 and laid on top of the chopped glass fiber 58 such that the second resin paste layer 14 is below the upper carrier film layer 12. This forms the SMC sheet 10 shown in FIG. 1A. A wire mesh belt 70 compacts the SMC sheet 10 to form a compacted SMC sheet 77 of a desired area weight prior to rolling onto a take up roll 72. By controlling the amount of pastes 14' and 18' deposited by the respective doctor blades 66, 56, by a simple gap adjustment, one skilled in the art can control both the overall compacted sheet 77 weight and the percentage of filamentized reinforcement material that is contained within each compacted composite sheet 77.

As the film layer 20 passes under the device 17, the film layer 20 pulls the bottom of the viscous paste 18', and may form a puddle of paste within the device 17. The viscous paste 18' may therefore move in a circular pattern, thereby causing a meniscus to form between the back edge of the paste puddle and the film (a void exists between the rear wall of the paste adjacent the film due to a radius formed on the puddle of paste). Depending upon the film speed and the paste viscosity, the meniscus may be as long as a few centimeters. Periodically, possibly due to film stretching, the meniscus collapses and air is trapped within the paste 18'. This trapped air exits underneath the doctor blade 56 in the form of bubbles, resulting in a resin film layer having non-uniform thickness, or can form fisheyes in the final surface. This can cause local regions having higher or lower glass content within the paste film, which in turn can cause unwet regions in the molding compound.

In an alternative embodiment, as shown in FIG. 2B, a funnel-shaped dispensing device 17B replaces one or more of the traditional dispensing devices 17. In one embodiment, both illustrated devices comprise such funnel-shaped devices, although not illustrated as such in FIG. 2B. The funnel-shaped dispensing device 17B helps to prevent the entrapment of air that is common in traditional dispensing devices such as device 17, as described in the preceding paragraph. To control viscosity in the dispensing device 17B, heat or cooling may be applied to the device 17B to maintain a constant temperature, and thereby better enable and control the viscosity and flow therefrom. Heat may be applied to the device 17B near the exit 22 of the device 17B to decrease the viscosity of the paste 18' and thereby improve wet-out of the glass fibers or mat within the sheet 10. In this regard, the heat source (not shown) could be applied against or within a wall 24 of the device 17B near the exit 22 or by using the dividing plate 23 as a heat source within the vertical feeding slot 21. Alternatively, a volumetric paste extrusion device may be employed.

The output of the device 17B is controlled by controlling the viscosity of the paste 18' through composition and temperature, plus controlling the pressure within the feeding slot 21, which may be accomplished by controlling the height of the paste in the device 17B, and may include an optional pressurization of the device 17B through known mechanical means (not shown). Accordingly, by controlling the pressure, underfeeding and overfeeding of the doctor blade may be avoided, thereby avoiding too thin, or too thick application (or a mess), respectively. Further, one skilled in the art appreciates that more than one funnel may be provided in series, and accordingly more than one type of paste may be deposited onto the sheet; for example, the first funnel may include a non-filamentized paste to provide a resin rich layer on the outside of the part, and a filamentized paste may be deposited by a second funnel adjacent the nonfilamentized paste.

As shown in FIG. 2B, the new funnel-shaped dispensing device 17B is preferably attached to the doctor box, and more preferably the lip of a conventional doctor blade, as shown in FIG. 2A. The height of the paste 18' is controlled via a float valve or similar device so one does not overfeed the doctor blade 56 and force excessive paste underneath the blade 56. The device 17B contains a foot 19 that extends out into the main dispensing area that ensures that the film layer 20 does not catch when the machine is in operation. The foot 19 is adjusted to have a small gap between it and the film layer 20 that is sufficient to prevent the paste 18' from flowing out the back of the dispensing device 17B. Further, the dispensing device 17B has a vertical feeding slot 21, which is preferably divided into two or more narrower slots 21' by one or more dividing plates 23, each such slot 21, 21' forming a column of paste. The first such slot 21' nearest the foot 19 first contacts the carrier film 20. In the event that the paste deposited from the first such slot 21' includes air bubbles or incompletely coats the film 20, each subsequent slot 21' will help to coat over any imperfection in the paste from the preceding slots 21'. Thus, the multi-slotted funnel-shaped dispensing device 17B is engineered to reduce trapped air or voids within the paste 18', and to form a layer 18 with uniform weight and thickness. Preferably, the width of the slots 21 and 21' are adjustable by either installing fewer/additional, thinner/thicker plates 23, and/or adjusting walls 24. In a preferred embodiment the foot 19 is positioned between about 0.03–0.25 inch above the film 20, and the tip of the doctor blade 56 is positioned between about 0.05–0.125 inches above the film 20, however these gaps will depend upon the paste composition, viscosity, and overall operating conditions.

Each batch of compacted SMC sheet 77 is then allowed to mature and thicken thereby increasing viscosity at approximately thirty-two degrees Celsius for approximately one to fourteen days prior to any molding application. The batch may then be further processed by cutting the SMC sheet 10 to an appropriate ply or laminate size, removing the upper and lower carrier films 12, 20, molding the remaining material to an appropriate shape in a heated matched metal or composite die, and curing it under heat and pressure to make a finished composite part (not shown). Preferably, the curing step is done at approximately 5–10 MPA (750–1500 psi) at about 140–163 degrees Celsius (280–325 Degrees F.) for about one-half to three minutes.

During the compaction step described above, excess resin from the resin paste layer 14 and resin impregnated filamentized fiber layer 18 penetrates within and through the partially filamentized or unfilamentized fiber 58 to form the discrete resin impregnated unfilamentized or partially filamentized fiber layer 16.

However, the filamentized fibers 57 within the resin impregnated filamentized fiber layer 18 generally do not significantly penetrate within this fiber layer 16 during compaction. The compacted SMC sheet 77, when cured, forms a composite part in which visible surface layer forms a resin rich and nearly porous free layer that has improved surface characteristics with less surface pores as compared with traditional sheet molding compound composites.

While the above example indicates only one ply of SMC sheet 77, it is understood that more than one ply is typically used to form a composite part. The number of plies of the SMC sheet 77 used to form the composite article varies as a function of the thickness (i.e. volume) of the composite part desired and the weight per square meter of the SMC sheet 77, but typically ranges from two to four plies. In a preferred embodiment, a top ply of the SMC sheet 77 and one or more plies of conventional SMC, such as those produced in FIG. 1B, made according to the prior art are placed in the mold. This forms a composite part having a Class A surface side on a visible side of the composite part, and a non-class A surface that is usually found on the non-visible side. If both the top and bottom surface of the composite part formed need Class A surfaces, then a top ply and bottom ply of the compacted SMC sheet 77 may be used, with one or more plies of sheet molding compound made according to the prior art contained within these sheets 77. In another preferred embodiment, the ply has a sheet weight adequate to form the composite part with a single ply.

In addition, if conductive materials such as carbon or nickel coated carbon or glass fibers are used in the filamentized fiber layer 18, a cured composite part having improved electrostatic sprayability characteristics may be realized. Such conductive fibers may be used in addition to, or instead of, glass fibers. Similarly conductive flakes, fibrils, powders, or carbon or nickel coated carbon or glass fibers or conductive particles may be used in the resin impregnated filamentized fiber layer, each of which is to be considered as conductive fibers for the purposes of this disclosure. Further, by concentrating the conductive materials within the fiber layer 18 at a location which is very close to the surface of the composite part, less conductive material is needed within the composite part as compared with traditional sheet molding compound composite parts having conductive material, which reduces raw material costs.

While the invention has been described in terms of preferred embodiments, it will be understood, of course, that the invention is not limited thereto since modifications may be made by those skilled in the art, particularly in light of the foregoing teachings.

What is claimed is:

1. A single ply of a sheet molding composite sheet prior to compaction used for making composite parts having improved surface characteristics comprising:

an upper carrier film layer;
   a first resin paste layer;
   a plurality of chopped unfilamentized fibers;
   a resin impregnated chopped and filamentized fiber layer; and
   a bottom carrier film layer wherein said single ply is compacted, and wherein said plurality of chopped unfilamentized fibers form a resin impregnated unfilamentized fiber layer after the single ply of the sheet molding composite sheet is compacted.

2. The sheet molding composite sheet of claim 1, wherein the composition of the resin component of said first resin paste layer and said resin impregnated chopped and filamentized fiber layer comprises a polyester resin.

3. The sheet molding compound of claim 2, wherein said composition of said first resin paste layer and said resin impregnated chopped and filamentized fiber layer further comprises fillers, a resin inhibitor and initiator, an alkaline earth oxide, and an internal mold release agent.

4. The sheet molding compound of claim 1, wherein the fiber composition of said resin impregnated chopped and filamentized fiber layer comprises filamentized E-type glass fibers.

5. The sheet molding compound of claim 1, wherein the fiber composition of said resin impregnated chopped and filamentized fiber layer further comprises filamentized conductive fibers.

6. The sheet molding compound of claim 1, wherein the fiber composition of said resin impregnated chopped and filamentized fiber layer further comprises conductive fibers.

7. A single ply of a sheet molding composite sheet prior to compaction used for making composite parts having improved surface characteristics comprising:

an upper carrier film layer;
   a first resin paste layer;
   a plurality of chopped partially filamentized fibers;
   a resin impregnated chopped and filamentized fiber layer; and
   a bottom carrier film layer wherein said single ply is compacted, and wherein said plurality of chopped partially filamentized fibers form a resin impregnated partially filamentized fiber layer after the single ply of the sheet molding composite is compacted.

8. The sheet molding composite sheet of claim 7, wherein the composition of the resin component of said first resin paste layer and said resin impregnated chopped and filamentized fiber layer comprises a polyester resin.

9. The sheet molding compound of claim 8, wherein said composition of said first resin paste layer and said resin impregnated chopped and filamentized fiber layer further comprises fillers, a resin inhibitor and initiator, an alkaline earth oxide, and an internal mold release agent.

10. The sheet molding compound of claim 7, wherein the fiber composition of said resin impregnated chopped and filamentized fiber layer comprises filamentized E-type glass fibers.

11. The sheet molding compound of claim 7, wherein the fiber composition of said resin impregnated chopped and filamentized fiber layer further comprises filamentized conductive fibers.

12. The sheet molding compound of claim 7, wherein the fiber composition of said resin impregnated chopped and filamentized fiber layer further comprises conductive fibers.

* * * * *